Figure 1:
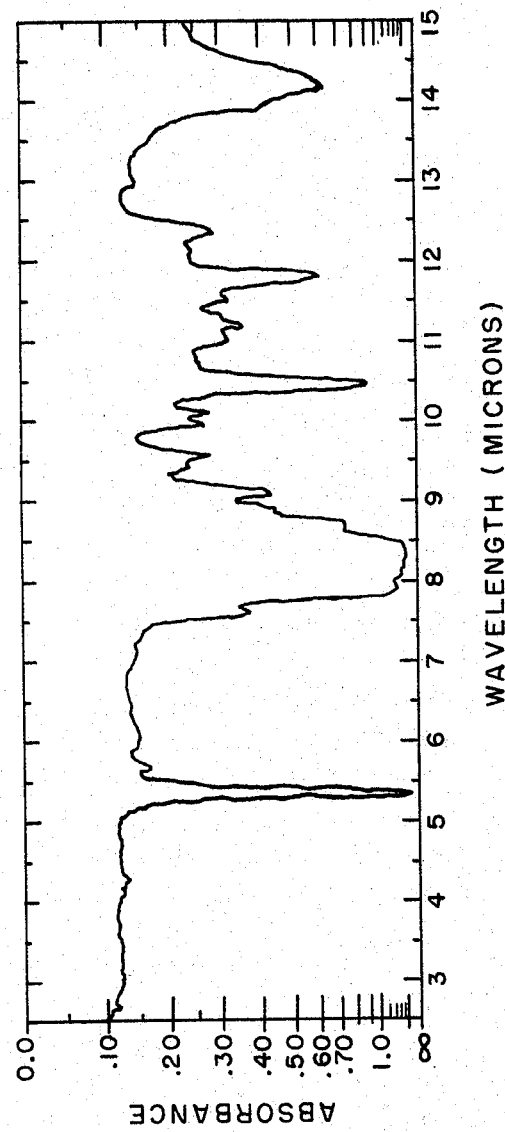

INFRARED SPECTRUM OF DICHLOROPERFLUOROCYCLOHEXANE-1,4 DIACYL FLUORIDE

INFRARED SPECTRUM OF PERCHLOROFLUOROCYCLOHEXANE-1,4 DIACYL FLUORIDE ISOMERS.

3,332,993
PERHALOGENATED CYCLOHEXANE DIACYL FLUORIDES AND THEIR PREPARATION

Henry R. Nychka, Dover, and Cyril Woolf, Morristown, N.J., assignors to Allied Chemical Corporation, New York, N.Y., a corporation of New York
Filed Sept. 3, 1964, Ser. No. 394,148
4 Claims. (Cl. 260—544)

This invention relates to new perhalogenated cyclohexane-1,4-diacyl fluorides, their derivatives and to a process for preparing them. More particularly, it relates to such compounds containing 1 to 4 nuclear chlorine substituents and 9 to 6 nuclear fluorine substituents.

Efforts made in the past directed to the production of polyfluorinated cyclohexane derivatives containing reactive functional groups have been largely unsuccessful. Attempted direct fluorination of various functional group-containing starting materials with the known fluorinating agents have resulted primarily in cleavage of the functional group and breakdown of the starting material and product.

An object of the present invention is to provide a process for producing perhalogenated cyclohexane-1,4-diacyl fluorides by the direct halogenation of tetrachloro or tetrafluoro benzene-1,4-diacyl chloride or fluoride.

These and other objects are accomplished according to our invention wherein the tetrahalo-1,4-benzene diacyl halide is subjected, in the liquid phase, to the action of gaseous chlorine trifluoride diluted with nitrogen or other inert gas in the proportion of between about one volume and five volumes inert gas, at temperatures between about 50° C. and about 200° C. until perhalogenation is complete.

The process of our invention proceeds according to the equation:

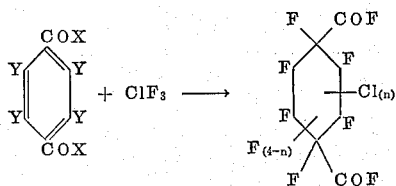

wherein X and Y may be the same or different and each represents a halogen selected from the group consisting of fluorine and chlorine; $n$ is an integer from 1 to 4.

The tetrachloro and tetrafluoro-1,4-benzene diacyl fluoride and chloride used as starting material in our reaction are solids under normal atmospheric conditions. The tetrachloro benzene-1,4-diacyl chloride has a melting point of about 145° C., a boiling point of about 331° C. The tetrafluorobenzene-1,4-diacyl fluoride has a melting point of about 89° C., a boiling point of about 195° C. The tetrachlorobenzene-1,4-diacyl fluoride boils at approximately 275° C. The tetrafluorobenzene-1,4-diacyl chloride has a melting point of about 37° C., a boiling point of about 215° C.

The reaction products obtained according to the process of our invention will depend to some extent on the nature of the starting material. When the tetrachlorobenzene-1,4-diacyl chloride or fluoride is fluorinated, the end product will be primarily a mixture of tetrachlorohexafluoro-1,4-diacyl fluoride isomers $C_6F_6Cl_4$-1,4-$(COF)_2$, as the nuclear chlorines will not be significantly substituted by fluorine, while the chlorines on the functional acyl group will be substituted.

When the starting material is the tetrafluorobenzene-1,4-diacyl chloride or fluoride, the end product will be a mixture of the perfluoro, mono, di and tri chloro-cyclohexane-1,4-diacyl fluoride with sometimes small amounts of the completely fluorinated compound:

|  | B.P., ° C. |
|---|---|
| $C_6F_{10}(COF)_2$ | 106 |
| $C_6F_9Cl(COF)_2$ | 136 |
| $C_6F_8Cl_2(COF)_2$ | 164 |
| $C_6F_7Cl_3(COF)_2$ | Approx. 190 |
| $C_6F_6Cl_4(COF)_2$ (isomers) | 170–238 |

The diacyl fluorides prepared as above can be converted to derivatives by reaction with various compounds containing a reactive hydrogen for example to the corresponding carboxylic acids by hydrolysis, to the esters by reaction with alcohols and to the amides by reaction with ammonia, and to the benzhydrazide by reaction with benzhydrazide.

The new compounds of our invention have the following general formula:

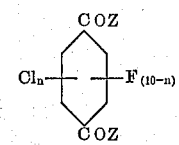

wherein Z is a member selected from the group consisting of fluorine, hydroxyl, oxyalkyl, $-NH_2$ and the benzhydrazo radical

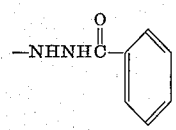

$n$ is an integer from 1 to 4 inclusive.

In the drawings FIGURE 1 shows the infrared spectrogram of monochloroperfluorocyclohexane-1,4-diacyl fluoride $C_6ClF_9$-1,4-$(COF)_2$ with characteristic absorption peaks at 5.35, 7.90, 10.48, and 11.80 microns.

Figure 2:
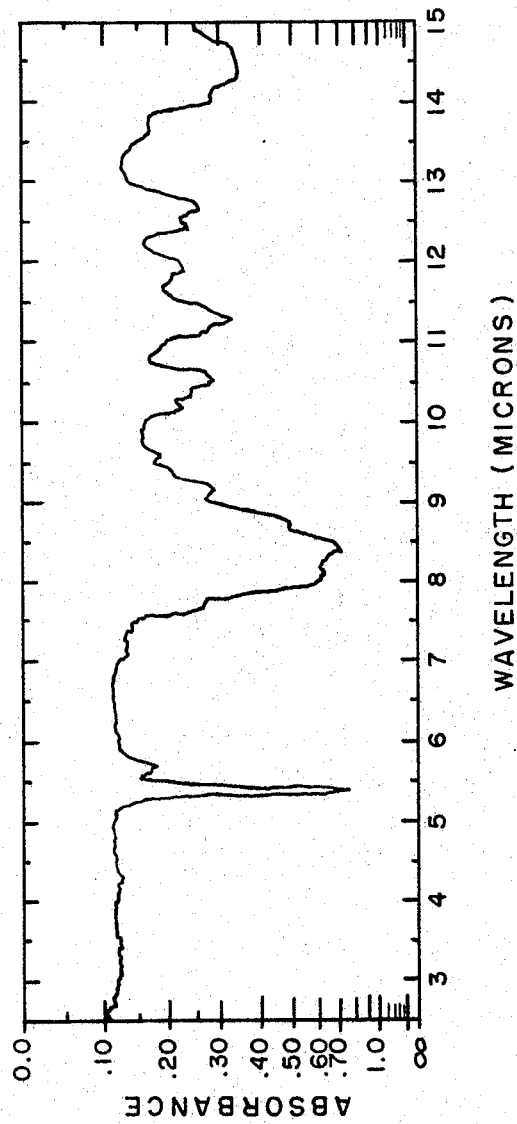

FIGURE 2 is the infrared spectrogram of dichloroperfluorocyclohexane-1,4-diacyl fluoride, $C_6Cl_2F_8$-1,4-$(COF)_2$ with characteristic absorption peaks at 5.37, 8.40, 10.52, and 11.30 microns.

Figure 3:
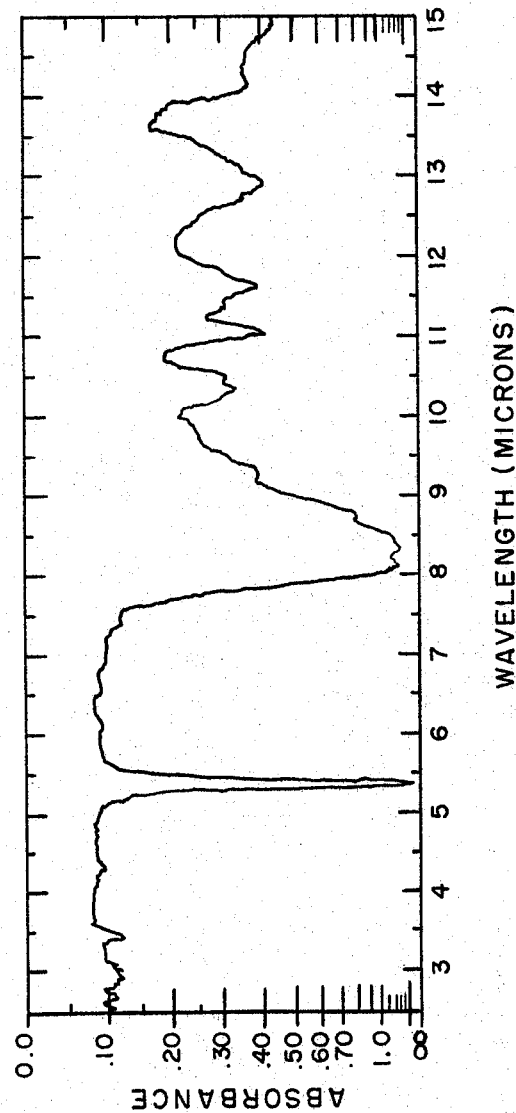

In the drawings, FIGURE 3 depicts the infrared spectrogram of the tetrachorohexafluorocyclohexane-1,4-diacyl fluoride isomers $C_6F_6Cl_4$-1,4-$(COF)_2$ with characteristic absorption peaks at 5.37, 8.10, 8.34, 11.00, 11.63, and 12.91 microns.

Among the new compounds coming within the scope of the above, the following may be specifically mentioned:

Tetrachloroperfluorocyclohexane-1,4-diacyl fluoride:

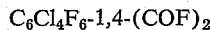
$C_6Cl_4F_6$-1,4-$(COF)_2$

Trichloroperfluorocyclohexane-1,4-diacyl fluoride:

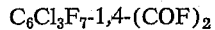
$C_6Cl_3F_7$-1,4-$(COF)_2$

Di-chloroperfluorocyclohexane-1,4-diacyl fluoride:

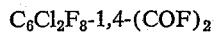
$C_6Cl_2F_8$-1,4-$(COF)_2$

Monochloroperfluorocyclohexane-1,4-diacyl fluoride:

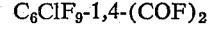
$C_6ClF_9$-1,4-$(COF)_2$

Mono-, di-, tri-, and tetra-chloro-perfluoro-cyclohexane-1,4-dicarboxylic acids:

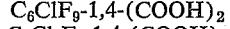
$C_6ClF_9$-1,4-$(COOH)_2$
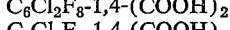
$C_6Cl_2F_8$-1,4-$(COOH)_2$
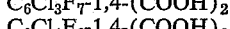
$C_6Cl_3F_7$-1,4-$(COOH)_2$
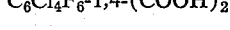
$C_6Cl_4F_6$-1,4-$(COOH)_2$ Mono, di-, tri-, and tetra-chloroperfluorocyclohexane-1,4-diamides:

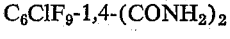
$C_6ClF_9$-1,4-$(CONH_2)_2$ $C_6Cl_2F_8$-1,4-$(CONH_2)_2$
$C_6Cl_3F_7$-1,4-$(CONH_2)_2$
$C_6Cl_4F_6$-1,4-$(CONH_2)_2$ 1,4-dicarboxy-mono-, di-, tri- and tetrachloroperfluorocyclohexane-bis-benzhydrazide:

$C_6ClF_9$-1,4-$(CONHNHCOC_6H_5)_2$
$C_6Cl_2F_8$-1,4-$(CONHNHCOC_6H_5)_2$
$C_6Cl_3F_7$-1,4-$(CONHNHCOC_6H_5)_2$
$C_6Cl_4F_6$-1,4-$(CONHNHCOC_6H_5)_2$

Mono-, di-, tri-, and tetra-chloroperfluorocyclohexane-1,4-dicarboxylic acid esters especially the 1 to 18 carbon alkyl esters including the methyl, ethyl, propyl, butyl, pentyl, hexyl and so on through the octadecyl ester, the alkyl group being represented by R:

$C_6ClF_9$-1,4-$(COOR)_2$
$C_6Cl_2F_8$-1,4-$(COOR)_2$
$C_6Cl_3F_7$-1,4-$(COOR)_2$
$C_6Cl_4F_6$-1,4-$(COOR)_2$

In carrying out the process of our invention, a tetrachloro- or tetrafluoro-benzene-1,4-diacyl chloride or fluoride, solid under normal atmospheric conditions, is contacted in the liquid phase with chlorine trifluoride (B.P. 11° C.). Preferably, a stream of gaseous $ClF_3$ diluted with nitrogen or other inert gas is passed into the stirred liquid acyl halide at a temperature above the melting point, but preferably not in excess of the boiling point of the reaction mixture, temperatures varying for the different perhalo compounds used. In general, reaction temperatures betwen about 40° C. and about 200° C. are suitable. The reaction in its early stages is usually exothermic, so that cooling may be required for the first part of the fluorination, the temperature being maintained in the lower portion of the indicated range. After the reaction is no longer exothermic, higher temperatures are used to drive the reaction to completion. The fluorination is complete when the reaction mass is free of double bonds. The progress of the fluorination can be followed by periodic infrared analyses which record the presence or absence of double bonds by the characteristic presence or absence of absorption peaks at 6.75 microns indicative of aromaticity and at 5.7–6.1 microns indicating presence of double bonds. Fluorination is usually complete as indicated by the absence of double bonds, in between about 25 hours and about 50 hours. In some cases, notably in fluorination of $C_6F_4$-1,4-$(COCl)_2$, rate of reaction in the latter stages of the fluorination becomes so slow that excessive reaction times and temperatures are necessary to completely saturate all the double bonds. In such cases, we have found that the fluorination may readily be completed with gaseous fluorine. Thus, when continued contacting of the unsaturated reaction mass with $ClF_3$ fails to produce any appreciable further reduction of unsaturation at the predetermined reaction temperature, the reaction mass is contacted with gaseous fluorine at temperatures considerably lower than that required for the $ClF_3$ fluorination, for example, between about 20° C. and about 35° C. Under such conditions, saturation of the mass is usually complete in not more than about 6 hours. Carrying out the reaction in the liquid phase, the tetrachlorobenzene-1,4-diacyl halide may be mixed with an inert liquid such as perfluorotributyl amine or excess of the perhalogenated benzene-1,4-diacyl halide reaction product to serve as reaction medium, or the tetrahalobenzene-1,4-diacyl halide may simply be melted and no extraneous reaction medium used.

The new compounds of our invention, because of their reactive functional groups, are useful as starting materials and intermediates in the preparation of a wide variety of derivatives. Thus, the initially produced perhalocyclohexane-1,4-diacyl fluorides are amenable to the standard reactions commonly carried out upon acyl halides, including hydrolysis to produce the corresponding 1,4-dicarboxylic acids, ammonolysis to produce the diamides and alcoholysis to produce diesters and reaction with benzhydrazide to form the dihydrazide. These derivatives are useful in the preparation of polymers, including polyamides, polyesters, polyoxadiazoles, and the like.

A particular utility of the $C_6F_6Cl_4$-1,4-$(COF)_2$ is that it is readily dehalogenated by passing it over iron gauze at 500° C. to yield $C_6F_6$ which is useful as a specialty solvent for polytrifluorochloroethylene and as a heat transfer fluid for use in the electrical field as an inert transformer fluid. $C_6F_6$, in spite of its high price, is finding wide application in this field. The perfluorotetrachlorocyclohexane-1,4-diacyl fluoride $C_6F_6Cl_4(COF)_2$ is additionally useful as a partition liquid in the vapor phase chromatographic analysis for the determination of impurities in corrosive gases such as $ClF_3$, HF, $Cl_2$, $OF_2$ and the like, for example as an impregnant for the stationary phase in the column.

The following specific examples further illustrate our invention. Parts are by weight except as otherwise noted.

EXAMPLE 1

A fluorination was carried out in which 27.5 grams (0.10 mole) of tetrafluoro-benzene-1,4-diacyl chloride, $C_6F_4(COCl)_2$, M.P. 37° C., was melted and placed into a three neck, pear shaped glass flask equipped with a gas inlet tube, thermowell and a 12-inch stainless steel water cooled condenser and with means for agitation. Twin streams of $ClF_3$ and nitrogen were passed at a $N_2$ rate of 7 to 13 ml. per minute and an average $ClF_3$ rate of 26 ml. per minute into the $C_6F_4(COCl)_2$ in the reaction flask held at the temperatures shown in the table. Progress of the fluorination reaction was monitored by running infrared spectrograms on samples taken at intervals during the course of the reaction and noting the decrease in the absorption intensity and final disappearance of the aromatic peaks at 6.75 microns and 5.92 microns and the emergence and increase in absorption intensity of the COF peak at 5.35 microns. Results of the $ClF_3$ fluorination are shown in Table I below:

TABLE I

| Total Time (hrs.) | Total $ClF_3$ (g.) | Max. ° C. | Infrared Data (Microns) |
|---|---|---|---|
| 6.0 | 45 | 112 | Main aromatic peak at 6.75 and COCl peak at 5.65 are no longer present. Unsaturated peak at 5.92 and COF (conjugated) at 5.47 appeared. |
| 12.0 | 83 | 100 | λ max. COF—5.35. λ max. COF (Conjug.)—5.47. λ max. C=C—5.92. |
| 18.0 | 118 | 130 | λ max. COF—5.35 (increasing). λ max. COF (Conjug.)—5.47 (decreasing). λ max. C=C—5.92 (decreasing). |
| 24.0 | 159 | 140 | Spectrum shows peaks similar to those at 18 hr. interval with double bonds still remaining. |

Fluorination was then continued with fluorine, fed into the nitrogen stream and thence to the reaction mixture after cooling to about 20° C. In 6.25 hours at temperature range of 20–33° C. and $F_2$ rate of 0.03M per hour the remaining double bonds were saturated. The infrared spectrum of the final material showed only one-COF absorption peak at 5.35 microns. The unsaturation which showed at 5.92 microns was decreased to trace amounts.

Total recovery of product was 26.8 grams. This amounts to about a 75% recovery of product based on converting $C_6F_4(COCl)_2$ to $C_6F_{10}(COF)_2$. Twenty-five grams of product was charged to a Nester/Faust spinning band column (6 mm. x 18 inch) for distillation. Reflux ratio of about 10:1 was used. A plot of the distillation, boiling point versus weight of distillate, showed three fractions. The yield of each fraction is based on taking midpoints between each plateau. A tabulation of the distillation results follows in Table II below:

TABLE II

| Fraction | Wt. (g.) | Percent Charge | Percent Yield | B.P., °C. |
|---|---|---|---|---|
| 1. $C_6F_{10}$-1,4-$(COF)_2$ | 2.4 | 10 | 7 | 106 |
| 2. $C_6F_9Cl$-1,4-$(COF)_2$ | 9.7 | 41 | 26 | 136 |
| 3. $C_6F_8Cl_2$-1,4-$(COF)_2$ | 5.0 | 21 | 13 | 164 |
| Residue | 6.4 | 27 | | |

Elemental and infrared analyses for the center cuts of the above fractions are shown in Table III.

TABLE III

| Fraction | Analysis, Calcd./Found | | | | Infrared Data Major Peaks (microns) |
|---|---|---|---|---|---|
| | C | H | F | Cl | |
| $C_6F_{10}(COF)_2$ | | | | | 5.36; 7.88; 8.15; 8.60; 10.35; 11.60.[1] |
| $C_6F_9Cl(COF)_2$ | 25.6/25.1 | Nil/Nil | 56.2/55.2 | 9.55/10.21 | 5.35; 7.90/10.48; 11.80.[2] |
| $C_6F_8Cl_2(COF)_2$ | 24.7/25.1 | Nil/Nil | 48.9/47.9 | 18.3/17.8 | 5.37; 8.40; 10.50; 11.30.[2] |

[1] 5% $CCl_4$ solution.
[2] Film on mull plate.

EXAMPLE 2

A repetition of the fluorination of the $C_6F_4$-1,4-$(COCl)_2$ for the purpose of accumulating an ample stock of product for preparation of derivatives was carried out and is summarized below.

Charge _____ 35.5 g. (0.13M) $C_6F_4(COCl)_2$.
$ClF_3$ used _____ 250 g. (in 27 hours to 138° C.).
$F_2$ used _____ 0.02M per hour for 9 hours at 25–31° C.
$N_2$ rate _____ 4–13 ml./min.
Recovery _____ 32 grams.

Distillation gave the following distribution:

| Fraction | Wt. (g.) | Percent charge | Percent yield |
|---|---|---|---|
| $C_6F_{10}(COF)_2$ | Nil | | |
| $C_6F_9Cl(COF)_2$ | 9.8 | 31 | 20 |
| $C_6F_8Cl_2(COF)_2$ | 12.0 | 38 | 24 |
| Residue | 9.1 | 28 | |

EXAMPLE 3.—$ClF_3$ FLUORINATION OF $C_6Cl_4$-1,4-$(COCl)_2$ (TCTPC)

A 200 gram sample of tetrachloroterephthaloyl chloride (TCTPC) was placed in a 500 ml. three-neck flask equipped with a magnetic stirrer, gas inlet tube and a water condenser. The TCTPC (M.P. 145° C.) was heated to 150° C. and $ClF_3$ was introduced diluted with nitrogen (1 vol. $ClF_3$:5 vol. $N_2$) at rate of about 0.05 mol per hour. $ClF_3$ introduction was increased gradually during the run until it was about 0.20 mol per hour. The reaction was heated when necessary to maintain a temperature of about 170° C. During the course of the reaction additional 200 gram and 600 gram portions of TCTPC were added, making a total of 1,000 grams altogether. The reaction was complete when a 5% $CCl_4$ solution of the product no longer showed unsaturation in the infrared region of 5.50 to 6.20 microns. Four mols of $ClF_3$ were required for every mole of TCTPC. A summary of the experiment including infrared data follows:

| Reaction Time, hours (total) | TCTPC Total (g.) | $ClF_3$ Total (g.) | Max. °C. | Infrared Data 50% $CCl_4$ Soln. | |
|---|---|---|---|---|---|
| | | | | —COF | —C=C |
| 6.0 | 200 | 120 | 170 | | |
| 11.8 | 400 | 210 | 163 | | |
| 17.0 | 1,000 (2.93M) | 295 | 164 | | |
| 24.0 | | 440 | 163 | 5.41; 5.38 | 6.13. |
| 30.3 | | 585 | 183 | Same | Same. |
| 37.3 | | 745 | 182 | Same | Same. |
| 44.8 | | 935 | 180 | 5.37 | Very weak. |
| 51.5 | | 1,090 (11.8M) | 190 | 5.37 | Nil. |

A light yellow, low melting solid weighing 1164 g. was obtained. Atmospheric distillation gave 46 g. of forerun and 769 g. of a water white product of B.P. range 170–238° C. This represents a 55% yield of product, average structure $C_6F_6Cl_4$-1,4-$(COF)_2$, based on TCTPC charged. A yellow waxy residue of 338 grams was also obtained.

Analysis based on $C_6F_6Cl_4(COF)_2$—Calculated: C, 22.7; F, 36.1; Cl, 33.7. Found: C, 23.0; F, 37.2; Cl, 33.6.

EXAMPLE 4.—ESTERIFICATION OF $C_6F_6Cl_4$-1,4-$(COF)_2$

A sample of 18.0 grams of $C_6F_6Cl_4$-1,4-$(COF)_2$ was added dropwise to 150 ml. absolute ethanol in 15 minutes causing temperature to rise from 33° C. to 51° C. The mixture was refluxed for 3 hours. After removal of ethanol, vacuum distillation gave a water-white product of 16 grams in 80% yield, B.P. 90–164° C./2 mm.

In subsequent runs the alcoholic solution was neutralized with $NaHCO_3$ prior to distillation. (The yields were slightly higher in these runs.) Infrared spectrum of diester showed absorption bands at 3.34 microns and 5.65 microns. These were assigned to CH and C=O ester stretching vibrations, respectively. Elemental analyses are shown below based on $C_6F_6Cl_4$-1,4-$(COOC_2H_5)_2$.

Calculated: C, 30.4%; H, 2.11%; F, 24.0%; Cl, 29.9%. Found: C, 28.9%; H, 1.96%; F, 25.2%; Cl, 33.2%.

EXAMPLE 5.—ESTERIFICATION OF $C_6F_9Cl(COF)_2$

To a solution of 10 ml. anhydrous ether and 5 ml. absolute ethanol, 6.13 grams (0.017M) of $C_6F_9Cl$-1,4-$(COF)_2$ dissolved in 10 ml. ether was added dropwise.

Refluxing of ether which began immediately was continued for one hour. After removal of ether and ethanol, vacuum distillation gave 4.4 grams (61% yield) of diester, B.P. 127–130° C./5 mm. Major infrared absorption peaks of a film of sample were at 5.66; 7.85; 8.30; 8.70; 9.90; 10.49; and 11.70 microns.

Analysis based on $C_6F_9Cl(COOC_2H_5)_2$: Calculated: C, 33.9; H, 2.36; F, 40.4; Cl, 8.38. Found: C, 35.4; H, 3.20; F, 41.5; Cl, 8.73. Calculated molecular weight: 424.5. Found: 447.

EXAMPLE 6.—DIAMIDE OF $C_6F_6Cl_4$-1,4-$(COF)_2$

Anhydrous ammonia was pased into 8.5 g. (0.02M) of $C_6F_6Cl_4$-1,4-$(COF)_2$ dissolved in 100 ml. of ether at a rate sufficient to produce gentle refluxing. Ammonia addition was continued for one hour after the reaction no longer was exothermic. Total reaction time was two hours. The ether solution was filtered and evaporated to dryness. A tan solid, M.P. 50–59° C. was obtained. It was identified as the diamide and equal to a 72% yield. Attempted purification by sublimation was unsuccessful. The infrared spectrum showed characteristic absorption bands for the amide function: N—H at 2.98 microns, C=O amide at 5.80–5.90 (broad) and at 6.28 microns. Elemental analysis based on $C_6F_6Cl_4$1,4-$(CONH_2)_2$:

Calculated: C, 23.1%; H, 0.96%; F, 27.5%; Cl, 34.2%; N, 6.73%. Found: C, 23.5%; H, 1.10%; F, 29.3%; Cl, 34.6%; N, 6.42%.

EXAMPLE 7.—PREPARATION OF 1,4-DICARBOXY-DICHLORO-OCTAFLUOROCYCLOHEXANE BIS-BENZHYDRAZIDE

To a 100 ml. refluxing solution of carbon tetrafluoride containing 3.0 grams (0.022 mole) of benzyhydrazide, 3.89 grams (0.010 mole) of dichlorooctafluorocyclohexane-1,4-diacid fluoride was added. Precipitation occurred immediately. The mixture was refluxed for 15 minutes, and was then filtered, yielding 5.04 grams of tan colored crude product which was washed with hot water. The resulting product amounted to 3.53 grams equivalent to a 56% yield, and had a melting point of 243° C. Infrared analysis and elemental analysis indicated the bis benzhydrazide of the formula:

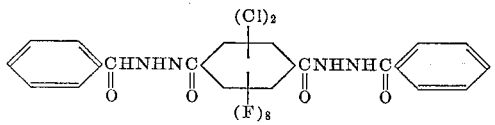

Analysis based on $C_{22}H_{14}F_8Cl_2O_4$:

Calculated: C, 42.5%; H, 2.26%; F, 24.5%; N, 9.02%. Found: C, 41.4%; H, 2.18%; F, 26.2%; N, 8.83%.

While the above describes the preferred embodiments of the invention, it will be understood that departures may be made therefrom within the scope of the specification and claims.

We claim:
1. The process for preparing perhalogencyclohexane-1,4-diacyl halides, which comprises contacting a tetrahalobenzene-1,4-diacyl halide of the formula:

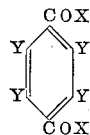

wherein X and Y each represent a halogen selected from the group consisting of chlorine and fluorine, with chlorine trifluoride in liquid medium at temperatures between the melting and boiling points of the tetrahalobenzene diacyl halide until substantially all the carbon to carbon double bonds in the tetrahalobenzene-1,4-diacyl halide have been saturated with halogen.

2. A mixture of perfluorotetrachlorocyclohexane-1,4-diacyl fluorides prepared according to the process of claim 1 wherein the tetrahalobenzene-1,4-diacyl halide starting material is tetrachlorobenzene-1,4-diacyl chloride or fluoride.

3. The process for preparing perhalogencyclohexane-1,4-diacyl halides, which comprises contacting a tetrahalobenzene-1,4-diacyl halide of the formula:

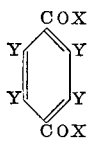

wherein X and Y each represent a halogen selected from the group consisting of chlorine and fluorine, with chlorine trifluoride in liquid medium at temperatures between the melting and boiling points of the tetrahalobenzene diacyl halide until saturation has proceeded to the point where no appreciable further decrease of unsaturation occurs on continued contacting with $ClF_3$, then continuing the contacting of the reaction mass with elemental fluorine until the carbon to carbon double bonds in the tetrahalobenzene-1,4-diacyl halide are completely saturated with halogen.

4. A mixture of perfluorochlorocyclohexane-1,4-diacyl fluorides prepared according to the process of claim 3 wherein the tetrahalobenzene-1,4-diacyl halide is tetrafluorobenzene-1,4-diacyl chloride or fluoride.

References Cited

UNITED STATES PATENTS 2,717,871    9/1955    Schloberg et al. _____ 260—544

OTHER REFERENCES

Stephens et al.: "Quarterly Review," vol. 162 (1962), pages 63–66.

LORRAINE A. WEINBERGER, *Primary Examiner.*

RICHARD K. JACKSON, *Assistant Examiner.*